United States Patent [19]

Abrahamsen

[11] Patent Number: 4,645,388

[45] Date of Patent: Feb. 24, 1987

[54] RIGHT ANGLE EXTENSION DRILL

[76] Inventor: Johan Abrahamsen, 390 N. Burgher Ave., Staten Island, N.Y. 10310

[21] Appl. No.: 800,450

[22] Filed: Nov. 21, 1985

[51] Int. Cl.$^4$ ............................................. B23B 45/14
[52] U.S. Cl. .................................... 408/127; 173/163
[58] Field of Search ................ 408/85, 114, 126, 127; 173/29, 46, 163

[56] References Cited

U.S. PATENT DOCUMENTS

| | | | |
|---|---|---|---|
| 836,212 | 11/1906 | Pierce et al. | 408/114 |
| 2,106,937 | 2/1938 | Torbert | 408/127 |
| 2,414,637 | 1/1947 | Crump | 408/127 X |
| 2,711,199 | 6/1955 | Salsberg | 408/127 X |
| 3,016,073 | 1/1962 | Broussard et al. | 408/85 |
| 4,184,795 | 1/1980 | Medlin | 408/127 |
| 4,419,032 | 12/1983 | Flowers | 408/114 X |

*Primary Examiner*—Z. R. Bilinsky
*Attorney, Agent, or Firm*—Richard L. Miller

[57] ABSTRACT

A right angle extension drill is provided and consists of an adjustable right angle drive unit removably connectable to a portable power unit so that the power unit can drive the right angle drive unit for drilling holes within various materials. Extension poles can be used so that the right angle unit can reach a side of an overhead beam to drill a hole therein. The uppermost extension pole can be curved at its distal end which is connected to the right angle drive unit so that it will drive holes perpendicular to a ceiling from a position either above or below the ceiling.

5 Claims, 4 Drawing Figures

RIGHT ANGLE EXTENSION DRILL

BACKGROUND OF THE INVENTION

The instant invention relates generally to power drills and more specifically it relates to a right angle extension drill.

Numerous power drills have been provided in prior art that are adopted to drill holes within various materials. While these prior art units may be suitable for the particular purpose to which they address, they would not be as suitable for the purposes of the present invention as heretofore described.

SUMMARY OF THE INVENTION

A principle object of the present invention is to provide a right angle extension drill that will overcome the shortcomings of the prior art devices.

Another object is to provide a right angle extension drill that is designed to combine a right angle drive for an auger drill bit units extension poles from a power unit.

An additional object is to provide a right angle drill that is used to drill a hole in the side of an over head beam and to drill holes perpendicular to a ceiling from a position either above or below the ceiling.

A further object is to provide a right angle extension drill that is simple and easy to use.

A still further object is to provide a right angle extension drill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 5:
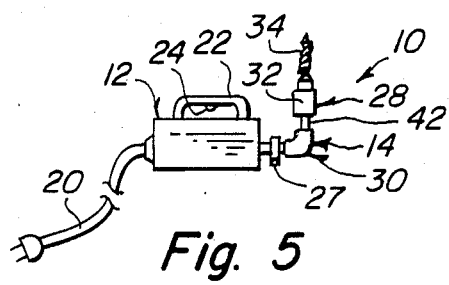
FIG. 5 is a side view of the invention assembled without any extensions poles inserted, so that it can be used in a manner similar to that of an ordinary right angle drill.
Figure 1:
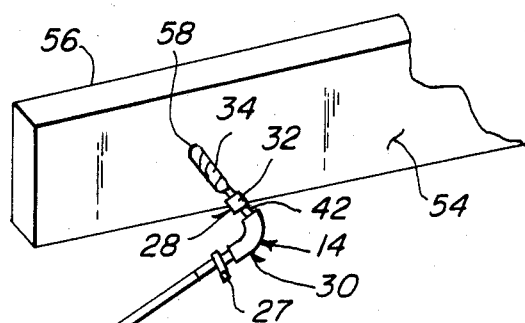
FIG. 1 is a perspective illustration of the invention being used to drill a hole in the side of an over head beam.
Figure 1:
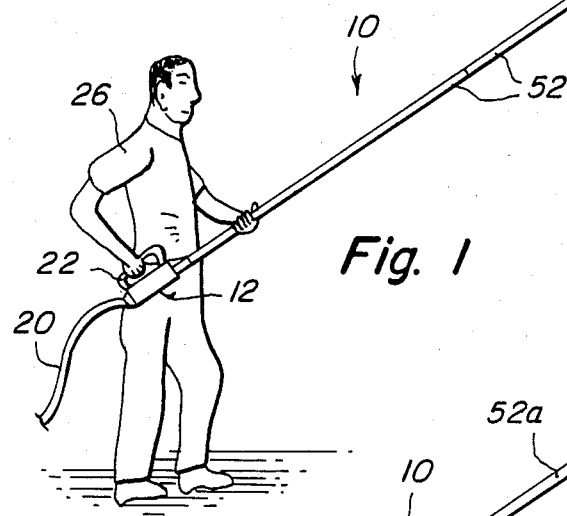

Turning now descriptively to the drawings, in which similar reference characters denote similar elements throughout the several views, FIGS. 1 through 5 illustrate a right angle extension drill 10 which typically contains a portable electrical power unit 12, although it is well known that even one not skilled in the art could substitute a gasoline power unit. An adjustable right angle drive unit 14 is removably connectable to the power unit 12 (see FIG. 5) so that the power unit can drive the right angle drive unit 14 for drilling holes within various materials.

The portable electrical power unit 12 includes an electrical power cord 20, a handle 22 and a switch 24 built into the handle. When holding the handle 20 a person 26 holding the handle 22 can operate the switch 24 which controls a motor (not shown) within the power unit 12.

Figure 2:
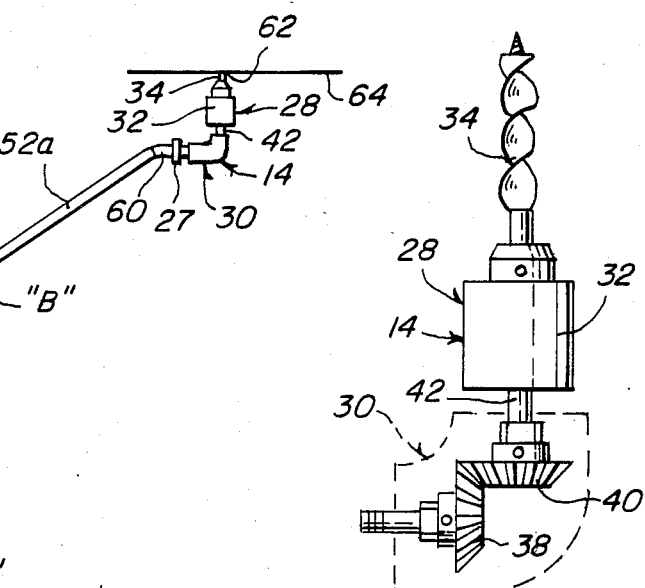
FIG. 2 is a diagrammatic detail of the gearing system driving the auger drill bit.

The right angle drive unit 14 is adjustable at clamp 27 and includes a drilling unit 28 and gearing system 30 to operate the drilling unit. The drilling unit 28 includes a chuck assembly 32 and an auger drill bit 34 detachably coupled to the assembly 32. The gearing system 30, as best seen in FIG. 2, includes a pinion 30 driven by the power unit 12 and a gear 40 that has a shaft 42 attached to the chuck assembly 32. The gear 40 is driven by the pinion 38 so that the shaft 42 can drive the chuck assembly 32 to turn the auger drill bit 34.

Extension poles 52 can be used (see FIG. 1) and are removably connectable to the power unit 12 and the right angle drive unit 14 so that the right angle drive unit can reach a side 54 of an overhead beam 56 to drill a hole 58 therein.

Figure 3:
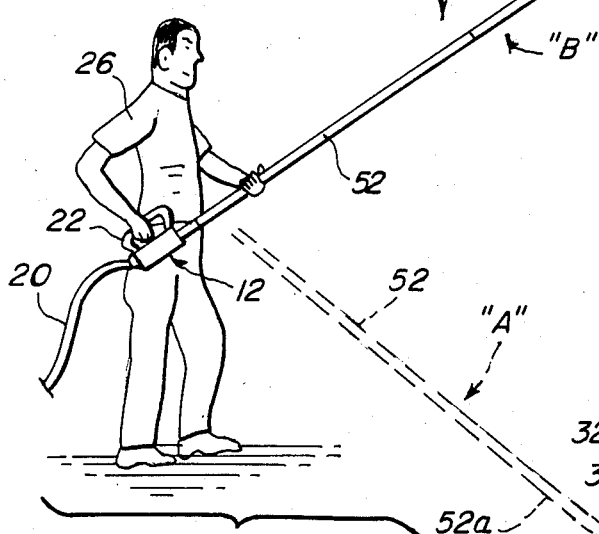
FIG. 3 is another perspective view illustrating how the invention may be used to drill holes perpendicular to a ceiling from a position either above or below.
Figure 4:
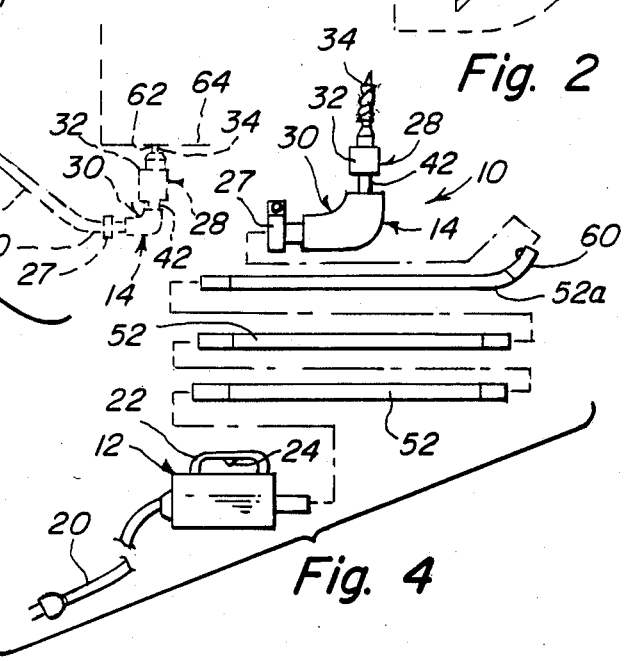
FIG. 4 is a disassembled view of the invention components.

In FIGS. 3 and 4 the uppermost extension hole 52a is curved at its distal end 60 which is connected to the right drive unit 14.

The right angle drive unit can drill holes 62 perpendicular to a ceiling 64 from a first position "A" above the ceiling as shown in dotted and a second position "B" below the ceiling 64 shown in solid in FIG. 3.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A right angle extension drill which comprises:
   (a) a portable power unit;
   (b) an adjustable right angle drive unit removably connectable to said power unit so that said power unit can directly drive said right angle drive unit for drilling holes within various material;
   (c) at least one extension pole removably connectable between said power unit and said right angle drive unit, so that said right angle drive unit can reach a side of an overhead beam to drill a hole therein parallel celing; and
   (d) at least one additional extension pole being curved at its distal end which can be connected to said right angle drive unit so that said right angle drive unit can also drill holes perpendicular to the ceiling form a first position above said ceiling, wherein there is formed an acute angle between the one extension pole and the drive unit, and a second position below said ceiling, wherein there is formed an obtuse angle between the one extension pole and the drive units.

2. A right angle extension drill as recited in claim 1 which said right angle drive unit includes a drilling unit and a gearing system to operate said drilling unit.

3. A right angle extension drill as recited in claim 2 wherein said drilling unit includes a chuck assembly and an auger drill bit detachably coupled to said chuck assembly.

4. A right angle extension drill as recited in claim 3 wherein said gearing system includes a pinion driven by said power unit and a gear heaving shaft attached to said chuck assembly, said gear driven by said pinion so that said shaft can drive said chuck assembly to turn said auger drill bit.

5. A right angle extension drill as in claim 1, and comprising a clamp at the entrance to said right angle drive unit to selectively clamp said at least one extension pole in a desired orientation to achieve the desired angular relationship.

* * * * *